United States Patent [19]

Welsch et al.

[11] Patent Number: 4,509,805
[45] Date of Patent: Apr. 9, 1985

[54] ENCLOSED SHELVING

[75] Inventors: John H. Welsch, Moscow; John J. Chapko, Wilkes-Barre; Robert J. Carver, Nanticoke, all of Pa.

[73] Assignee: Metropolitan Wire Corporation, Wilkes-Barre, Pa.

[21] Appl. No.: 406,251

[22] Filed: Aug. 9, 1982

[51] Int. Cl.³ .............................................. A47B 57/00
[52] U.S. Cl. .................................... 312/210; 312/250; 312/257 SK
[58] Field of Search ................... 220/6, 7, 19; 312/257 SK, 250, 210; 256/24, 33, 45; 211/181

[56] References Cited

U.S. PATENT DOCUMENTS

| | | | |
|---|---|---|---|
| 1,275,900 | 8/1918 | Gay | 256/45 X |
| 3,007,708 | 11/1961 | Ochs | 211/181 X |
| 3,101,148 | 8/1963 | Brown | 211/181 X |
| 3,589,746 | 6/1971 | Inglis | 108/111 X |
| 3,766,864 | 10/1973 | Baker et al. | 108/111 |
| 3,840,947 | 10/1974 | Burbidge | 256/33 X |
| 3,908,562 | 9/1975 | Wittschen | 108/111 X |
| 4,045,043 | 8/1977 | Fourrey | 108/111 X |
| 4,097,097 | 6/1978 | Hosko | 312/250 |

FOREIGN PATENT DOCUMENTS

| | | | |
|---|---|---|---|
| 4878272 | 5/1974 | Australia | 220/19 |
| 2430412 | 1/1976 | Fed. Rep. of Germany | 220/19 |

Primary Examiner—William E. Lyddane
Assistant Examiner—Joseph Falk
Attorney, Agent, or Firm—Goodman & Teitelbaum

[57] ABSTRACT

An enclosed shelving having a top shelf supported above a bottom shelf with each of the shelves including a peripheral lip, the enclosure having an open wire construction including side and rear panels provided with retaining fingers extending at the upper and lower ends thereof to engage the peripheral lip of the shelves, thereby retaining the panels in place. The fingers are offset with respect to the panels, with the extent of offset of the fingers alternating between a greater and lesser degree of offset to thereby straddle the peripheral shelf lip and retain the panels in place. A pair of front door panels are hinged to the side panels and are provided with a latching mechanism whereby the enclosed shelving can be used for security purposes.

28 Claims, 14 Drawing Figures

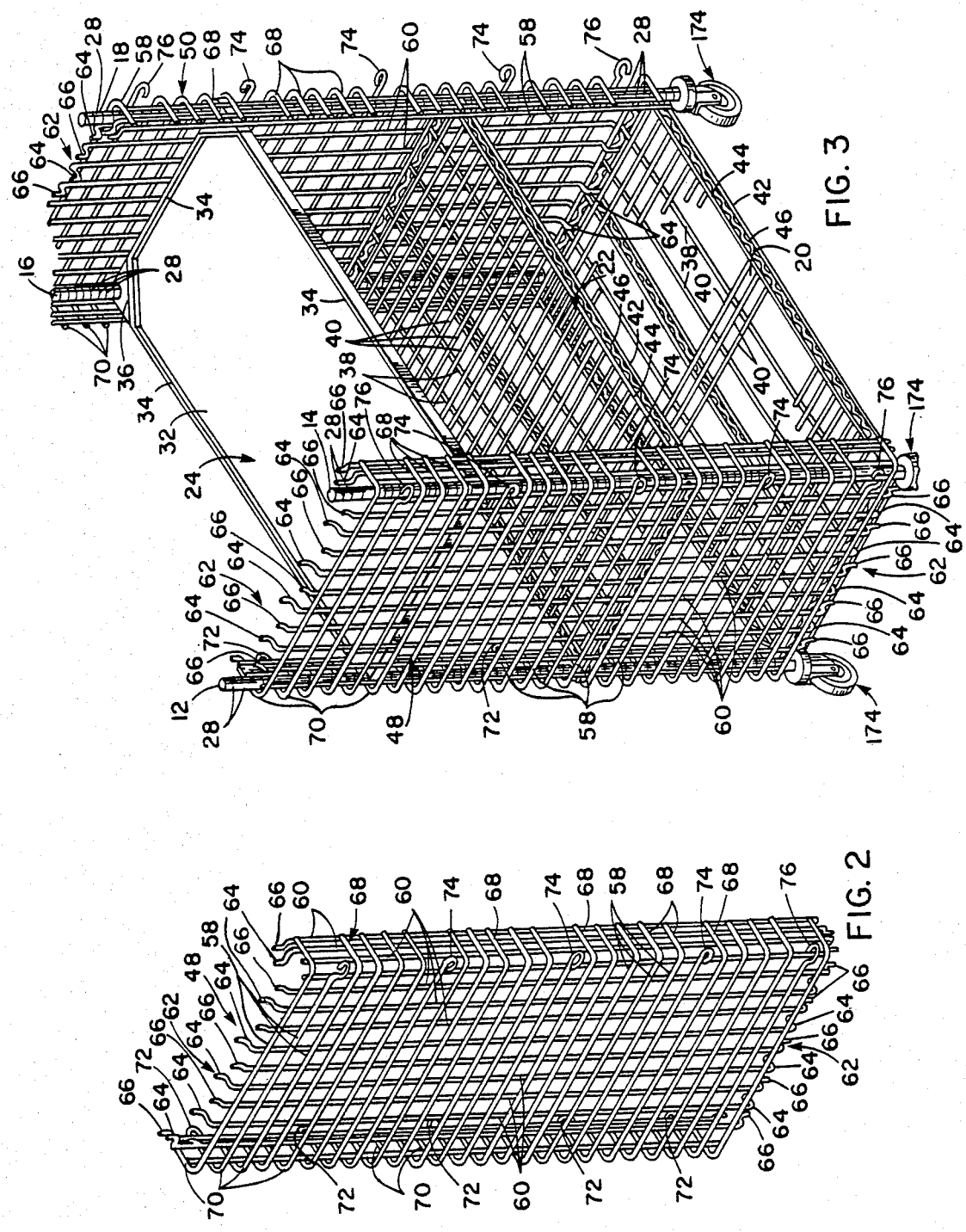

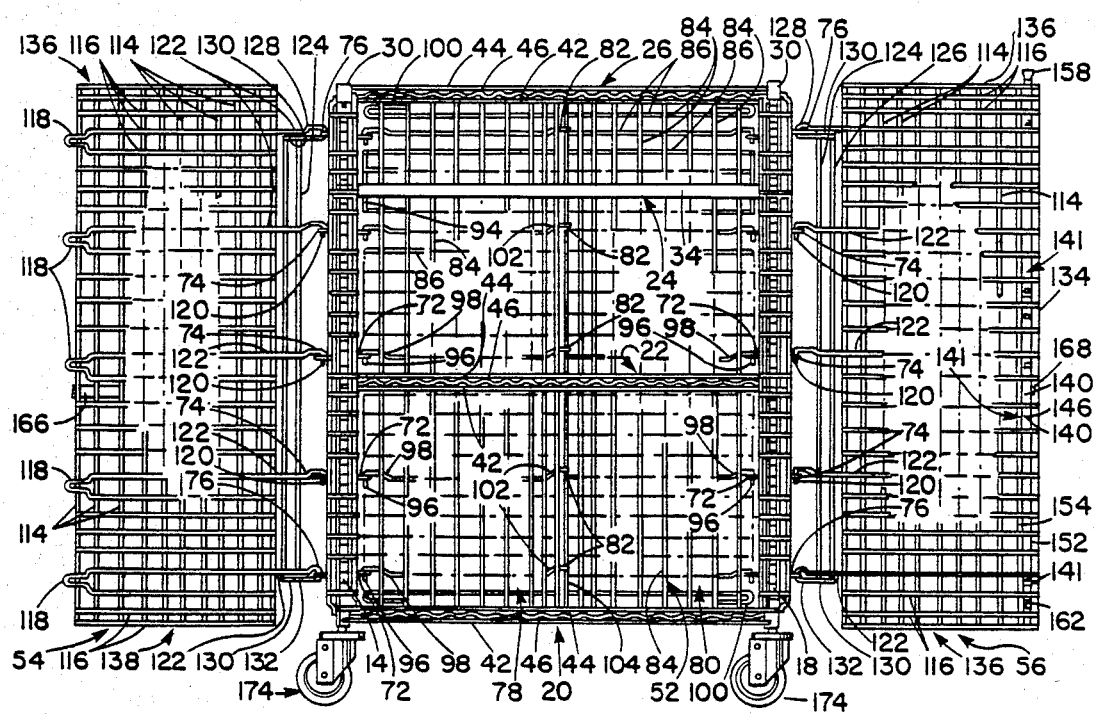
FIG. 9
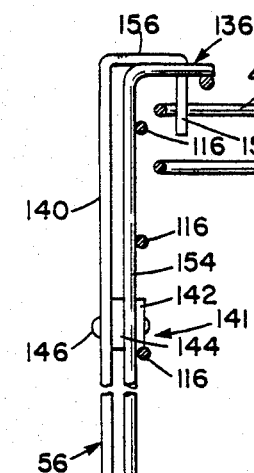
FIG. 10
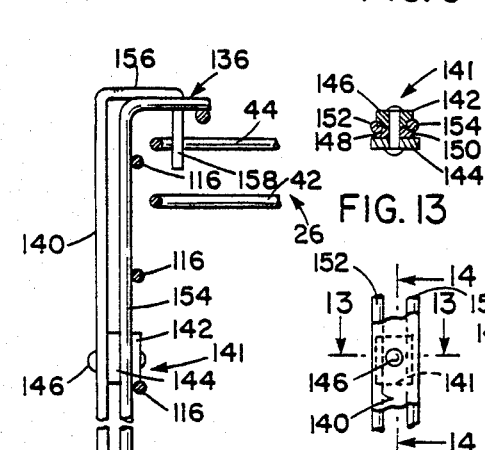
FIG. 12  FIG. 14
FIG. 13
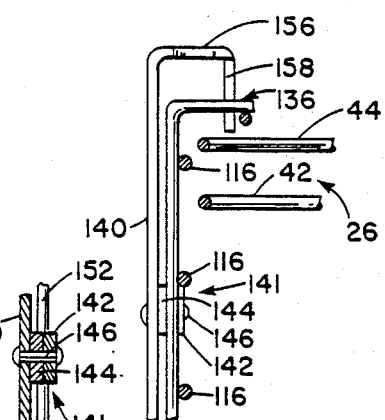
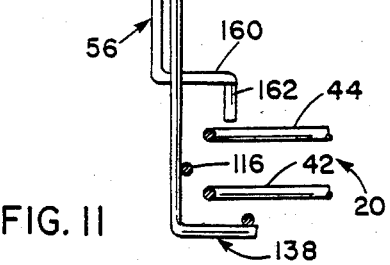
FIG. 11

ENCLOSED SHELVING

BACKGROUND OF THE INVENTION

This invention relates to enclosures for shelving, and more particularly to an enclosed shelving which finds use as a security unit such as a security cart and the like.

It is frequently desirable to provide partial or full enclosures to shelving. Such enclosures are useful in avoiding articles or items from falling off the shelves and breaking or becoming lost or misplaced. A most beneficial type of enclosure, that is often utilized for shelving, is the open wire construction type. This type of enclosure protects valuable articles or items from falling off, and, at the same time, keeps the entire content of the shelving visible at all times, and therefore makes it easy to check inventory.

Some enclosed shelving include only enclosures of the side and rear portions of the shelving. These enclosures, while providing protection to the items on the shelves, also provides convenient access to the items. Other types of enclosures include doors, and if the doors can be securely locked, the enclosed shelving provides a secure unit. These types of enclosures can be utilized as a security unit, or, where the shelving is on wheels, it can be used as a security cart. In some instances, the enclosed shelving will be placed on casters, mounted on a dolly, or left as a stationary unit.

Many prior art enclosures for shelving were difficult to ship in a knock down state so as to permit assembly by the user. In some cases, the shelving was formed in large sections which covered the entire rear or front of the shelves, and therefore made shipping and storage very bulky. In other cases, in order to provide the necessary security, unique top and bottom portions were provided for the shelving to interface with the panels. The need for tops and bottoms added additional weight and cost to the enclosures. In yet other types of prior art enclosed shelving, the enclosures were such that they could not be easily installed onto standard types of shelving. As a result, these enclosures only fit onto specially constructed shelving and were again very costly to use. In some situations, the prior art enclosures prevented the possibility of adjusting the shelving.

Accordingly, it is desirable to provide an enclosure for standard type shelving which can be shipped in a knocked down condition, and assembled by the customer with the enclosure providing easy assembly. At the same time, the enclosure should be such that when complete, it should be secure, and if used as a security unit, it should avoid the possibility of access to the shelving being enclosed.

SUMMARY OF THE INVENTION

Accordingly, it is an object of the present invention to provide an enclosure for shelving which can be easily assembled and securely maintained.

Another object of the present invention is to provide enclosed shelving, whereby the top and bottom shelf form the upper and lower portions of the enclosed shelving.

Another object of the present invention is to provide an enclosure for shelving, which can be shipped in a knocked down condition and easily assembled onto existing shelving.

Still a further object of the present invention is to provide shelving, which can be completely enclosed so as to provide a secure type of enclosure.

Yet a further object of the present invention is to provide an enclosure, which can be added onto existing adjustable shelving so as not to prevent the ease of adjustability of the shelving.

Still another object of the present invention is to provide enclosed shelving of the open wire construction, which easily fits onto existing shelving by interlocking into the periphery of an upper and lower shelf of the shelving.

A further object of the present invention is to provide an enclosed shelving having front door panels, which can be easily closed and securely locked.

Still a further object of the present invention is to provide enclosed shelving, wherein the front door panels can be opened to overlie the exterior of the side panels.

Briefly, in accordance with the present invention, there is provided an enclosed shelving having four corner posts with a top shelf and bottom shelf respectively supported on the corner posts. The shelves include a peripheral lip thereabout. Side panels and a rear panel are formed of open wire construction and include retaining fingers extending from the upper and lower ends of the panels for engaging the peripheral lip of the shelves to thereby retain the panels in place. Suitable interconnection is provided between the side panels and the rear panel.

In an embodiment of the present invention, the retaining fingers are forwardly offset with respect to the panels. The extent of offset between adjacent fingers alternates from a greater to a lesser degree of offset. In this manner, with the fingers installed on the peripheral lip, the adjacent fingers cumulatively straddle the lip to thereby retain the panels in place.

In another embodiment of the present invention, front door panels are also included and are also formed of open wire construction. The front door panels are suitably hinged to the side panels, whereby the front door panels can be completely opened so as to overlie the exterior of the side panels. A suitable closing arrangement is provided to retain the front door panels closed, whereby the entire shelving can be enclosed to permit the utilization thereof as a security unit or cart, security truck, and the like.

BRIEF DESCRIPTION OF THE DRAWINGS

With the above and additional objects, and advantages in view, as will hereinafter appear, this invention comprises the devices, combinations and arrangements of parts hereinafter described by way of example, and illustrated in the accompanying drawings of a preferred embodiment in which:

FIG. 2 is a perspective view of a side panel of the enclosed shelving;

FIG. 3 is a partially broken away perspective view, showing the enclosed shelving with two side panels installed in accordance with an initial step in the assembly of the enclosed shelving;

FIG. 9 is a front view of the open security cart of FIG. 1, showing the front door panels opened to a laterally extended position;

FIG. 10 is a side elevational view of the locking bar and its interrelationship with the right front door panel and the top and bottom shelves, specifically showing the locking bar in its lower, locked position;

FIG. 11 is a view similar to that shown in FIG. 10, showing the locking bar in its upper, unlocked position;

FIG. 12 is a partially broken away, front elevational view of a slide unit coupled to the locking bar for facilitating the upper and lower movement of the locking bar along adjacent vertical rods of the right front door panel;

FIG. 13 is a cross sectional view taken along lines 13—13 of FIG. 12; and

FIG. 14 is a cross sectional view taken along lines 14—14 of FIG. 12.

In the various figures of the drawing, like reference characters designate like parts.

DESCRIPTION OF THE PREFERRED EMBODIMENT

Figure 1:
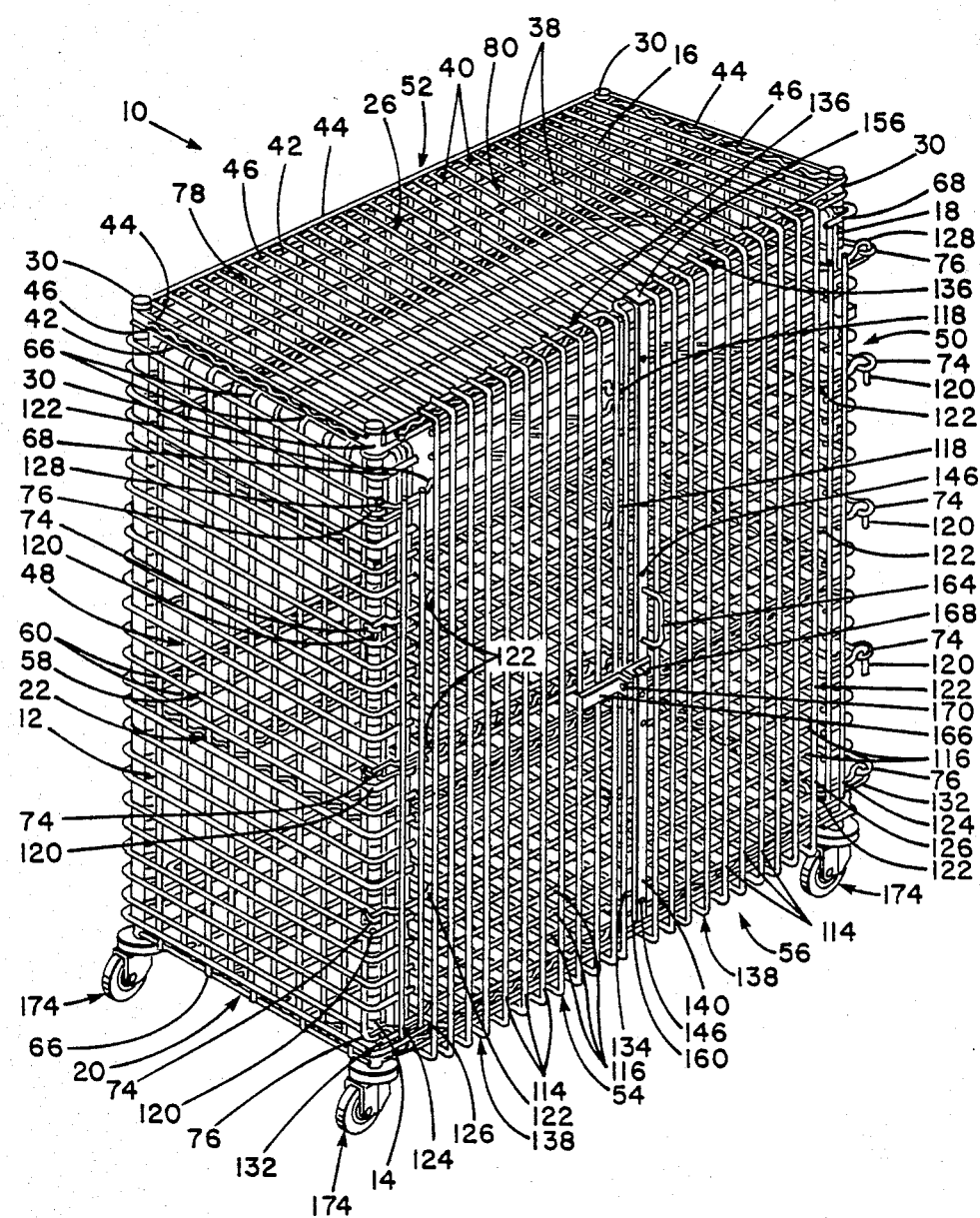
FIG. 1 is a perspective view of the enclosed shelving in the form of a security cart, in accordance with the present invention.

Referring now to the drawings, the enclosed shelving is shown in FIG. 1 in the form of a security cart 10 which is completely enclosed and movable. The shelving itself, as best shown in FIG. 3, includes four corner posts, 12, 14, 16 and 18, on which are positioned a number of different shelves. Shown by way of example, there are included a lower or bottom wire shelf 20, an intermediate wire shelf 22, an intermediate solid shelf 24, and a top wire shelf 26.

The particular shelving that is shown is of the adjustable shelving type described in U.S. Pat. No. 3,523,508, assigned to the assignee of the present invention. In this type of adjustable shelving, the corner posts are provided with graduated indentation 28, as shown in FIG. 3, to identify and locate specific height levels for shelving adjustment. The indentations could alternately be spirally formed about the corner posts so as to permit a continuous height adjustment, as described in U.S. Pat. No. 4,318,352, also assigned to the assignee of the present invention.

Each of the wire shelving is provided with frustoconical corner supports 30 which in turn fit over mating frustoconical sections that clamp on to the posts. The frustoconical sections include an inwardly extending rib which engage in the indentations 28 on the corner posts. Placing of the frustoconical corner supports 30 onto the frustoconical clamping sections urges them into place on the corner post and at the same time securely retains the wire shelf in place. In this manner, each wire shelf can be positioned at any suitable height, as described in the above mentioned patents.

In the case of the solid shelf 24, there is provided a flat shelf panel 32 with a peripheral lip 34 formed completely around the panel. The corners 36 are angled and include the above mentioned frustoconical sections therein, this type of solid shelf is described in U.S. Pat. No. 3,874,511, also assigned to the assignee of the present invention.

In the case of the wire shelves 20, 22 and 26, the shelves are formed of a criss-cross grid arrangement of horizontal rods 38 crossed by an orthogonal set of rods 40. The rods terminate in the side rail sections 42, 44 spaced vertically apart from each other and retained in position by means of the corrugated wire 46 formed therebetween. It should be noted that the side rails 42, 44 form a peripheral lip about the orthogonal shelving wires 38, 40. This shelf structure is described in more detail in the above mentioned patents, to which reference may be made, wherein the entire disclosure of these patents is herein incorporated by reference.

Figure 7:
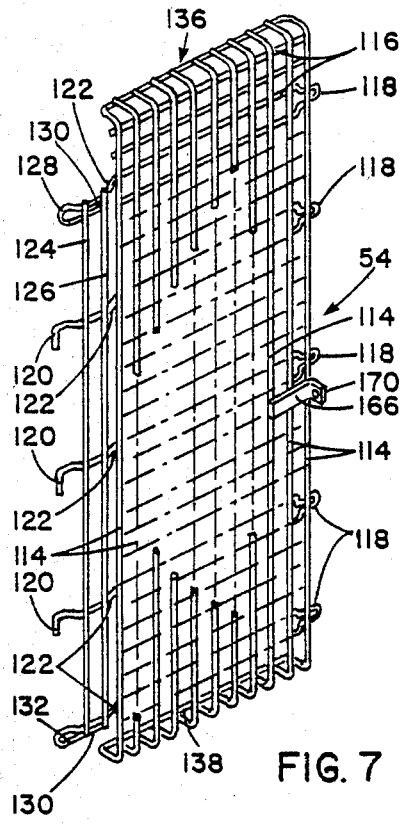
FIG. 7 is a perspective view of the left front door panel.
Figure 8:
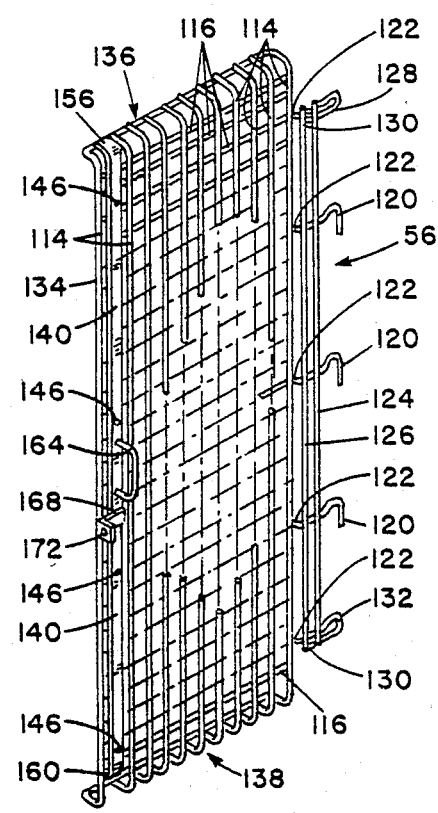
FIG. 8 is a perspective view of the right front door panel.

The enclosure for the shelving includes side panels 48, 50 (shown best in FIG. 3) interconnected by a rear panel 52 (shown best in FIG. 5) and left and right front door panels 54, 56 (shown best in FIGS. 7 and 8, respectively).

The side panels, 48, 50, as best seen in FIGS. 2 and 3, are formed of open wire construction including a set of spaced apart horizontal rods 58 interconnected by an orthogonal set of spaced apart vertical rods 60. In this way, a criss-cross grid is uniformly formed throughout the side panels 48, 50.

The upper and lower ends of the vertical rods 60 terminate in retaining fingers 62. The retaining fingers 62 extend from offset portions so as to place the retaining fingers in a plane forwardly of the plane of the open-wire grid construction of the panel itself. However, the extent of offset alternates between adjacent fingers. Accordingly, a first set of alternating fingers 64 are offset a greater amount than the alternating fingers 66 therebetween.

At both edges, the horizontal rods 58 have their distal ends bent to form a right angle wrap around extension. One extension 68 is at the front side and a corresponding wrap around extension 70 is at the rear side. The wrap around extension sections 68, 70 are each shown to include at least two vertical rods 60 with their fingers 64, 66 at the upper and lower end of the rods.

Selected ones of the horizontal rods 58 terminate in horizontally oriented closed loops 72 which extend horizontally outwardly from the wrap around section 70. The loops 72 are spaced apart so as to provide a plurality of loops 72 along the height of the panel. At the opposing end of selected ones of the horizontal rods 58, adjacent the bend of the section 68, there are also provided horizontally oriented loops 74. It should be noted, that the three central loops 74 are all identical in that they are outwardly turned and are of the closed loop type. The uppermost and lowermost loops 76, are inwardly turned and are of the open type. Furthermore, the loops 76 are slightly off-set at the bend in an outward direction away from the plane of the panel. It should be noted, that while the horizontally oriented loops 72 at the rear end extend from the wrap around section 70, the horizontally oriented loops 74, 76 at the opposite end extend forward directly from the plane of the side panel, and do not extend around the bend of the wrap around section 68.

Although FIG. 2 shows the side panel 48, it should be appreciated that the side panel 50 is identical to side panel 48. It should also be noted that the side panels 48, 50 are symmetric from top to bottom about a central horizontal axis lying in the plane of the side panel. In this manner, two identical panels can be utilized for the sides with each side panel being positioned on the opposing side by inverting one side panel relative to the other side panel. Thus, by turning side panel 48 in FIG. 2 up-side down, it becomes side panel 50 as shown in FIG. 3.

Figure 4:
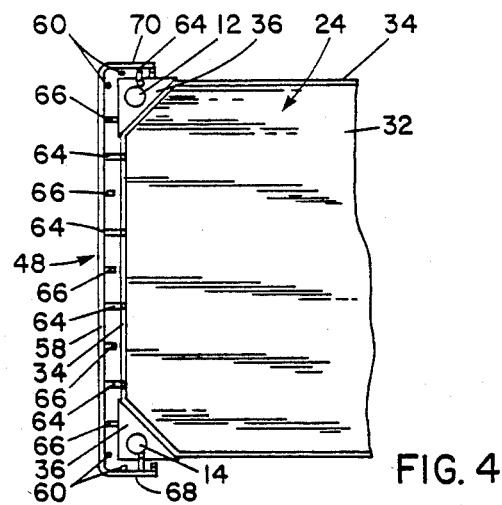
FIG. 4 is a partial top view of the shelving shown in FIG. 3, specifically showing one side panel positioned with respect to the corner posts.

The side panels 48, 50 are installed, as shown in FIGS. 3 and 4, on to the shelving before the top shelf 26 is mounted thereon. The lower alternately offset fingers 64, 66 are positioned so that they engage on either side of the peripheral side rails 42, 44 of the lowermost shelf 20 and thereby straddle the side rails 42, 22. In this manner, the lower ends of the side panels are supported. The side panels can then be pushed into engagement around the corner supports 30 and the corners 36, with the wrap around sections 68, 70 positioning themselves respectively on the front and rear of the shelving, as best shown in FIG. 4. The wrap around sections 68, 70 extend sufficiently so that they are inward of the corner posts 12, 14, and 16, 18. Accordingly, the wrap around sections 68, 70 snap around the corner supports 30 and the corners 36, and are thus held in position until they can be firmly secured, as will be hereinafter described.

Figure 5:
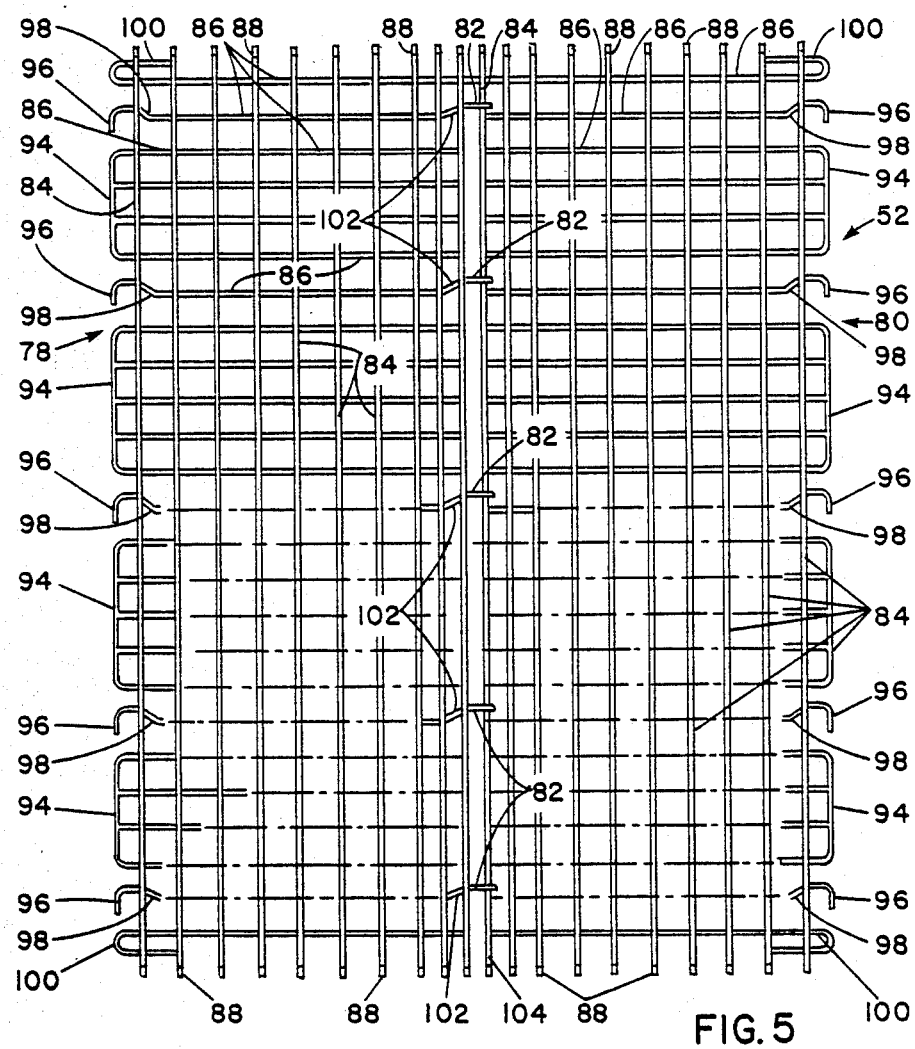
FIG. 5 is an elevational view of the rear panel, showing the two interconnected sections which form the rear panel.

With the side panels held in place, as shown in FIG. 3, the back panel 52 can then be installed. As shown in FIG. 5, the back panel 52 is formed of two adjacent sections 78, 80. The two sections, 78, 80 are substantially identical and are symmetrical from top to bottom about a horizontal axis lying in the plane of the sections. The only difference between the sections is that the section 78 includes interconnecting hooks 82 at the adjoining edge. These hooks 82 can be an integral extension of some of the horizontal rods.

Each of the sections 78, 80 is formed of an open wire construction including a set of parallel, spaced apart vertical rods 84, crossed by a set of spaced apart horizontal rods 86. The vertical rods 84 terminate at their upper and lower ends in retaining fingers 88. Again, as in connection with the side panels, the fingers are offset with adjacent fingers being offset by greater or lesser amounts. More specifically as best shown in FIG. 6, alternating fingers 90 of the retaining fingers 88 are offset by a greater amount from the plane of the rear panel with the other fingers 92 being offset a lesser amount, this construction being similar to the construction of the above mentioned alternating fingers 64, 66 of the retaining fingers 62.

Most of the horizontal rods 86 are interconnected at their distal ends by a vertical interconnection rod section 94. This provides for a finished outer lateral edge for the back panel 52. However, selected ones of the horizontal rods 86 terminate at their lateral ends in downwardly extending hooks 96 which are initially offset at 98 in a vertical direction from the rods 86. Five hooks 96 are shown at the lateral edge of each of the back panel sections 78, 80. The uppermost and lowermost rods 86 terminate in a folded over distal end 100 so as to provide a finished upper and lower edge.

As heretofore explained, the section 78 has selected ones of its horizontal rods 86 terminating in horizontally oriented hooks 82. The hooks 82 are slightly offset at 102 to be spaced from the corresponding horizontal rods 86 of section 80. The hooks 82 are hooked onto and securely grasp the innermost vertical rod 84 of the section 180, shown as vertical rod 104. In this manner, although the two back sections 78, 80 can be manufactured separately, and even shipped separately, they are preferably secured together at the time of assembly in the factory. However, because the sections 78, 80 are secured by means of the offset hooks 82, the sections 78, 80 can fold onto each other so as to lie flat against each, and can therefore be shipped in a smaller space or area, despite the large size of the shelving to be enclosed.

Figure 6:
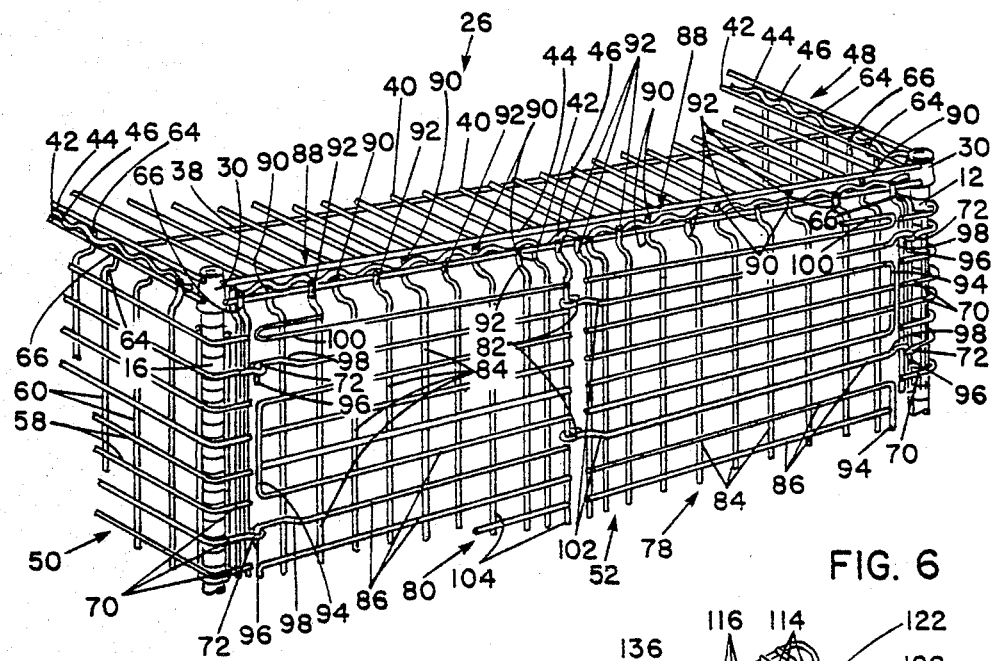
FIG. 6 is a partial perspective view taken from the rear of the cart, showing the rear and side panels installed and retained by a top shelf.

The rear panel 52 is installed between the side panels, as shown in FIG. 6. Specifically, the alternatingly offset fingers 90, 92 at the lower end of the rear panel 52 are inserted so as to straddle the rails 42, 44 peripherally about the lower shelf 20, in the same manner as the above mentioned side panels 48, 50. The downwardly extending hooks 96 are at the same time inserted into the horizontally oriented loops 72 extending from the wrap around the rear section 70 of the side panels 48, 50. In this manner, the back panel 52 together with the side panels 48, 50 are retained in place, thus forming a three wall enclosure for the shelving.

With both the side and rear panels retained about the shelving, the top shelf 26 is then positioned on the corner posts. The alternatingly offset fingers 64, 66 of the side panels 48, 50 are straddled on either side of the rails 42, 44, and the alternatingly offset fingers 90, 92 of the rear panel 52 also straddle the peripheral rails 42, 44, as best shown in FIG. 6. As a result, the top shelf 26 effectively locks the side panels and rear panel in place and secures it in position about the shelving.

Should the shelving be desired to be used as a simple enclosed shelving without any doors, the shelving can be retained in this manner with the side panels and rear panel positioned in place. It should be noted, that the lower shelf 20 serves as the base and the top shelf 26 serves as the top of both the shelving and the enclosure. As a result, no extra parts are needed for the top and bottom of the enclosed shelving since the actual shelves themselves are utilized. It should further be appreciated, that because of the interdigitated or alternatingly offset arrangement of the fingers, a secure inherent locking arrangement is provided between the panels and the shelving.

With the shelving enclosed by the side and rear panels, easy access can be had to the contents of the shelves, and at the same time articles or items will not fall off the sides, bottoms or back of the shelves because of the enclosure. Because of the open wire construction, easy access to the materials on the shelves can be had since they are easily viewable.

Should a complete enclosure be desired, front door panels can be added. Such panels 54, 56 are respectively shown in FIGS. 7 and 8.

Referring now to FIG. 7, the left hand door panel 54 is shown to be formed of an open wire construction including a plurality of spaced apart vertical rods 114 crossed by a plurality of spaced apart horizontal rods 116. The left outer edge of the door panel 54 is used to hinge onto one of the side panels, while the right inner edge is disposed adjacent to door panel 56. Selected pairs of horizontal rods extend laterally outwardly from the right inner edge of the door panel 54 to form extending tabs 118. The plurality of spaced apart tabs 118 along the height of rhe right inner edge form a stop or ledge for receiving the abutting left inner edge of the other door panel 56.

At the hinged left outer edge, selected ones of the horizontal rods 116 extend laterally beyond the door panel 54 and terminate in downwardly directed finger hooks 120. A plurality of such spaced apart hooks 120 are shown. These hooks 120 are forwardly offset at 122 so as to lie in a plane slightly forward of the plane of the door panel 54. Two vertical rods 124, 126 are coupled to the offset arm portions of the hooks 120.

Although additional fingers hooks 120 could be included so that the entire length of the door panel has spaced apart finger hooks 120, it has been found beneficial to include at least one circular type hook or loop, of the type shown at the upper end at 128. The loop 128 extends from a horizontal rod 116, is forwardly offset at 122, and terminates in a vertically oriented closed loop whose end 130 folds around and is secured to the two vertical rods 124, 126. A similar vertically oriented hook or loop 132 is formed at the lower end, also being forwardly offset at 122.

The hinge arrangement between the left front door panel 54 and the left side panel 48, can best be seen in FIGS. 1 and 9. It will be noted, that the downwardly depending finger hooks 120 fit into the horizontally oriented hooks 74 of the side panel 48. The uppermost vertically oriented loop 128 and the lowermost vertically oriented loop 132 of the door panel 54 engage the top and bottom open loops 76 of the side panel 48.

Although all of the hooks of the door panel 54 can be formed with the downwardly depending fingers 120 for engagement in the corresponding closed loops 74 of the side panel 48, it has been found that when using this type of hinge arrangement, the doors are not securely fixed to the side panels, whereby they can be lifted vertically from their hinges when the doors are open. By forming at least one vertically oriented loop 128, 132 on the front door panel which hooks with the inwardly directed open loops on the side panel, this lifting condition is avoided.

Specifically, each door panel is assembled by first engaging the three center vertical fingers 120 of the door panel with the three horizontal loops 74 of each associated side panel. The door panel is then tilted toward the top and subsequently toward the bottom corners of the door panel to allow the horizontal top and bottom open loops 76 of the side panel to engage the vertically oriented top and bottom loops 128, 132 of the door panel. In this way, there is provided a locking feature to the door panels to prevent them from being lifted or displaced from their hinges.

Although a single such locking loop 128, 132 could be utilized, both top and bottom locking loops are provided since the side panels are symmetrical about their horizontal axis and by making both an upper and lower open loop 76 at the side panels, it permits a single side panel to be utilized both for the right and left sides of the shelving.

By making the fingers 120 and the vertically oriented loops 128, 132 forwardly offset at 122, and by having the loops 74, 76 on the side panels extend forwardly from the side panel, the doors panels 54, 56 can be completely swung open 270° so as to overlie the exterior of the side panels 48, 50. In order to retain the door panels in this open position, side panels hooks (not shown) can be added to hold the door panels against the side panels. In this manner, although a completely closed security cart or enclosure can be provided, at the same time when an open enclosure is desired, the door panels can be completely swung or folded out of the way.

The right door panel 56 is shown in FIG. 8. This door panel 56 is of substantially the same construction as the left door panel 54, and will therefore only be briefly described. Specifically, there is again provided spaced apart vertical rods 114 which are crossed by spaced apart horizontal rods 116. Selected ones of the horizontal rods 116 terminate at their lateral right outer edges in downwardly depending finger hooks 120 which include offset portions 122. Vertically oriented closed loops 128 and 132 are formed at the top and bottom, also being offset at 122, with the ends 130 being secured to the vertical rods 124, 126 coupled to the offset arm portions.

At the abutting left inner edge of the right door panel 56, as shown in FIG. 8, the outermost vertical rod 134 terminates the door panel. It is noted, that there are not any tabs 118 extending therefrom, but rather the vertical rod 134 of the right door panel 56 will abut against the tabs 118 of the left door panel 54 which forms a ledge or stop for the vertical rod 134. In this manner, the tabs 118 respectively form a stop for the right hand door panel 56 and, at the same time, with the right hand door panel 56 closed or locked, as will hereinafter be described, it will automatically retain the left door panel closed or locked.

The upper ends of the vertical rods 114, 134 of the both the left and right door panels 54, 56 are inwardly bent at 136 or form flaps which overlie the uppermost shelf 26. Similarly, the bottom portions of the vertical rods 114, 134 of the left and right door panels 54, 56 are also inwardly bent to form the flaps 138 which underlie the lowermost shelf 20. In this way, as can be seen in FIG. 1, with the front door panels closed, the flaps 136, 138 will overlie the top and bottom of the shelving to provide a secure closing arrangement avoiding the possibility of unauthorized entry into the enclosure.

In order to securely close and lock the front door panels, there is provided a locking arrangement including a vertical bar 140 which is secured on the right door panel 56 adjacent the vertical rod 134 at its abutting left inner edge. The bar 140 is placed externally of the door panel 56 and includes locking fingers at its upper and lower edge which can be slid into locking arrangement with the top and bottom shelves, as set forth below.

More particularly, referring now to FIGS. 10-14, it will be noted that at the rear of the bar 140, there are connected at particular locations a slide member 141 including a pair of spacing members 142, 144 which are held together by means of a rivet 146 which pass through both spacing 142, 144 members and extends to the front of the bar 140.

At the lateral sides of the interface between the spacing members 142, 144 there are formed indents or channels 148, 150 which receive adjacent pairs of vertical rods 152, 154. The vertical rods 152, 154 can be the vertical rods 114 forming the open wire construction of the door panel itself. Alternately additional rods can be provided.

The slide member 141 permits the bar 140 to be vertically moved up and down by sliding it along the vertical rods 152, 154 which effectively form a pair of sliding rails. The lowermost position of the bar 140 is limited by means of one of the horizontal rod 116, as shown in FIG. 10. The uppermost position is limited by the next adjacent spaced horizontal rod 116. In this manner, the limit of movement of each of the slide members 141 is determined by the spacing between adjacent horizontal rods 116. It is noted that there is shown four slide members 141 secured to the bar 140, as indicated by the four rivets 146 in FIG. 8.

At the top of the bar 140, there is provided an inwardly directed horizontal section 156 which terminates in a downwardly directed finger 158. The finger 158 is positioned between the vertical rods 152, 154. A similar arrangement is formed at the bottom of the bar, where the lower end of the bar 140 extends into the inwardly directed horizontal section 160 which again terminates in a downwardly directed finger 162. Here again, the horizontal section 160 and the finger 162 are positioned between the vertical rods 152, 154.

With the bar 140 slid to its lowermost position, as shown in FIG. 10, the upper finger 158 will engage behind the peripheral lip of the top shelf 26 defined by means of the peripheral rails 42, 44 of that shelf. Similarly, the bottom finger 162 will engage between the peripheral rails 42, 44 of the lowermost shelf 20.

With the bar slid to its uppermost position, as shown in FIG. 11, the fingers 158, 162 are raised above the upper and lower shelves 26, 20 so as to clear the peripheral rails 42, 44 of those shelves, whereby the front door can be opened and is not held by means of the shelves.

Accordingly, using the arrangement as shown, when the door panels are closed, the left door panel 54 is closed first and then the right door panel 56 is closed onto the left door panel 54, with the bar 140 in its uppermost position, as shown in FIG. 11, so that the ledge 118 of the left door panel 54 fits behind the vertical rod 134 of the right door panel 56. The bar 140 is then moved downwardly to its lower extent, as shown in FIG. 10, so that the fingers 158, 162 engage behind the peripheral lips of the upper and lower shelves 26,20 whereby the door panels are securely held in place.

In order to facilitate movement of the bar 140 between its upper and lower positions, a U-shaped handle 164 is securely connected to the bar 140. Furthermore, in order to lock the door panels 54, 56 together, an adjacent pair of L-shaped locking members 166, 168 are securely placed respectively on the left door panel 54 as best shown in FIG. 7, and on the bar 140 of the right door panel as best shown in FIG. 8, so that the facing legs of the locking members 166, 168 abut each other. Aligned openings 170, 172 are respectively formed in the abutting legs for receiving the hasp of a conventional lock inserted therethrough. Thus, when the hasp of the lock is inserted through the aligned openings 170, 172, the locking members 166, 168 and therefore the door panels 54, 56 are secured together, whereby the secured locking member 168 prevents the lifting of the bar 140 which is secured thereto.

The enclosed shelving can be utilized without any wheels so that it stands directly on the ground to be used as a shelving unit, etc. Alternately, the enclosed shelving unit can be placed on a dolly so that it can be moved around. Furthermore, as shown in the figures, conventional caster wheels 174 can be inserted into each of the four posts as stem casters to permit easy movement of the cart. In this way, a security cart can be provided for use in various industries.

Because the various panels can be easily assembled, the enclosure can be shipped in knock down fashion and assembled by the customer. The assembly itself is extremely easy because of the use of the interdigitated, alternatingly offset finger arrangement which fits into the peripheral lip of the upper and bottom shelf. Furthermore, since the shelves themselves are used as the top and bottom, there are less parts that are required to be shipped. Additionally, because the back is formed in sections which are connected together, the size of the shipping thereof is reduced since these two sections can be folded onto each other, thereby limiting the extent of the width of the shipment.

Although the shelving described is of the type mentioned in the aforementioned patents, it should be understood that this enclosure can be used with other types of shelving as well.

Additionally, since the side panels are identical and, accordingly, can be interchanged by flipping them about a horizontal axis, there is little confusion as to proper assembly of the side panels.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. Enclosed shelving comprising:
    a top shelf supported above a bottom shelf, each of said shelves having a peripheral lip;
    side panels and a rear panel having an open wire construction disposed about said shelves;
    retaining finger means extending from upper and lower ends of said panels for engaging said peripheral lip of each of said shelves to retain said panels in place about said shelves;
    coupling means interconnecting said side panels and said rear panel;
    a pair of front door panels having an open wire construction;
    hinge means interconnecting each of said side panels to an associated one of said door panels;
    closure means for closing said front door panels; and
    said closure means including a vertically sliding bar secured onto one door panel of said pair, downwardly depending gripping fingers coupled to top and bottom portions of said bar for respectively engaging said peripheral lip of said top and bottom shelves when said bar is slid downwardly and releasing said peripheral lip when said bar is slid upwardly.

2. Enclosed shelving as in claim 1, wherein at least some of said retaining finger means are offset with respect to the panels, the extent of offset of said finger means alternating so that said finger means cumulatively straddle said peripheral lip to retain said panels in place.

3. Enclosed shelving as in claim 2, wherein said panels include horizontal and vertical rods in grid formation, said finger means at the upper and lower ends being integral extensions of said vertical rods.

4. Enclosed shelving as in claim 3, wherein lateral ends of said horizontal rods of said side panels are bent to lie in a plane perpendicular to said side panel to thereby define wrap around extensions disposed on front and rear portions of the shelves.

5. Enclosed shelving as in claim 4, wherein at least two vertical rods are included in each of said wrap around extensions with corresponding offset fingers at top and bottom ends of said two vertical rods.

6. Enclosed shelving as in claim 4, wherein rear distal ends of at least some of said horizontal rods of said wrap around extensions of said side panels terminate in horizontally oriented loops, and hooks laterally extending from said rear panel for engaging said loops, said loops and hooks defining said coupling means.

7. Enclosed shelving as in claim 6, wherein said hooks are integral extensions of said horizontal rods of said rear panel.

8. Enclosed shelving as in claim 7, wherein said hooks are vertically offset with respect to said horizontal rods of said rear panel.

9. Enclosed shelving as in claim 3, wherein said rear panel includes two separate sections, and connecting means for hingedly coupling said two sections together.

10. Enclosed shelving as in claim 9, wherein said connecting means includes integral horizontal loops laterally extending from at least some of said horizontal rods of one section of said rear panel, said loops hooking around an innermost vertical rod of the other section of said rear panel, wherein said two sections can fold onto each other for storage and shipment.

11. Enclosed shelving as in claim 6, wherein said side panels are identical to each other with each being symmetric about a horizontal axis lying in a plane of said side panel, whereby said side panels are interchangable with each other by inverting them about said horizontal axis.

12. Enclosed shelving as in claim 1, wherein said side panels and said front panels include horizontal and vertical rods in grid formation, and wherein front distal ends of at least some of said horizontal rods on said side panels terminate in horizontally oriented loops, and hook means laterally extending from each of said door panels for engaging said loops, said loops and hook means defining said hinge means.

13. Enclosed shelving as in claim 12, wherein said loops and hook means are integral with their respective horizontal rods.

14. Enclosed shelving as in claim 12, wherein said hook means are offset with respect to a plane of said door panels, whereby said door panels can be opened to overlie said side panels.

15. Enclosed shelving as in claim 12, wherein at least some of said hook means include an offset downwardly directed finger, and the correspondingly engaging loops are outwardly directed closed eyelets.

16. Enclosed shelving as in claim 12, wherein at least some of said hook means include vertically oriented eyelets, the correspondingly engaging loops being open loops.

17. Enclosed shelving as in claim 1 wherein top and bottom portions of said front door panels are rearwardly directed to provide top and bottom flaps for respectively overlying said top shelf and underlying said bottom shelf.

18. Enclosed shelving as in claim 1, and comprising spacer means disposed on a rear portion of said bar, opposing channels provided in said spacer means, said spacer means being positioned between an adjacent pair of vertical rods with said vertical rods being received in said opposing channels, whereby said bar rides vertically along said adjacent pair of vertical rods.

19. Enclosed shelving as in claim 1, wherein the other door panel of said pair includes ledge means laterally extending from an inner edge for engaging said one door panel, whereby said other door panel is retained closed with said one door panel latched.

20. Enclosed shelving as in claim 1, wherein said top and bottom shelves are of an open wire construction and have a wire peripheral ledge.

21. Enclosed shelving as in claim 1, wherein said shelving includes corner posts for supporting said shelves, and corner post receiving members having a frustroconical section shape adopted to receive frustroconical shaped clamping members for surrounding each corner post within said receiving members so that an inwardly extending rib of the clamping members is engageable within an indentation on said posts for securely holding said clamping members onto said posts.

22. Enclosed shelving as in claim 21, and comprising additional shelving adjustably positionable along said corner posts between said top and bottom shelves.

23. Enclosed shelving as in claim 21, and further comprising wheels positioned beneath said corner posts, whereby said enclosed shelving defines a security cart.

24. Enclosed shelving as in claim 1, wherein a first locking member is secured on the other door panel of said pair, and a second associated locking member is secured on said bar of said one door panel, said first and second locking members having aligned openings for receiving a hasp of a lock to secure said door panels together and to prevent upward movement of said bar to its released position.

25. Enclosed shelving as in claim 1, wherein the shelving includes corner posts and adjustable additional shelving on said posts, and wherein said panels include retaining means for facilitating enclosure of said shelving without interferring with the adjustment of said additional shelves.

26. Enclosed shelving as in claim 1, wherein said hinge means include hook means and loop means, one of which is on said front door panels, the other of which is on said side panels, whereby said front panels can open to a position with said front door panels disposed against said side panels.

27. Enclosed shelving as in claim 1, wherein said hinge means include retaining means for preventing vertical unhooking of said front door panels from said side panels.

28. Enclosed shelving as in claim 27, wherein said retaining means includes at least one vertically oriented eyelet and at least one correspondingly engaging open loop, one of which is on each of said front door panels, and the other of which is on each of said side panels.

* * * * *